United States Patent [19]

Bosch

[11] 3,909,615
[45] Sept. 30, 1975

[54] APPARATUS FOR MEASURING THE SURFACE DENSITY OF A WEB

[75] Inventor: Julius Bosch, Rathsberg, upper Erlangen, Germany

[73] Assignee: Frieseke & Hoepfner GmbH, Erlangen, Germany

[22] Filed: Feb. 7, 1974

[21] Appl. No.: 440,448

[30] Foreign Application Priority Data
Feb. 10, 1973 Germany............................ 2306550

[52] U.S. Cl. ................ 250/358; 250/360; 250/496; 250/514
[51] Int. Cl. .......................................... G01n 23/02
[58] Field of Search .......... 250/358, 359, 360, 308, 250/496, 497, 498, 505, 506, 511, 514

[56] References Cited
UNITED STATES PATENTS

| | | | |
|---|---|---|---|
| 3,179,800 | 4/1965 | McNamara......................... | 250/360 |
| 3,657,532 | 4/1972 | Zimmerman........................ | 250/362 |
| 3,662,174 | 5/1972 | McMullen et al. ................. | 250/358 |

Primary Examiner—Archie R. Borchelt
Attorney, Agent, or Firm—Karl F. Ross; Herbert Dubno

[57] ABSTRACT

An apparatus for measuring the surface density of a web has a portable and generally U-shaped housing in one of whose arms there is provided a radiation source. The other arm has across from the radiation source a first radiation detector, and a second radiation detector is provided in the one arm next to the radiation source. A shield operable by an adjustment knob on the housing can be displaced to vary the relative quantities of radiation passing from the source to each of the detectors. The detectors are connected to an electronic comparator whose output is read on a meter. In use the shield is adjusted until the meter reads zero indicating that both detectors are receiving radiation at the same level. Then a web is inserted between the two arms, thereby coming between the radiation source and one of the detectors, so that the meter will detect the relative change in the two radiation levels. This change is indicative of the surface density of the web inserted between the two arms. The meter can be calibrated in surface density, as in $g/m^2$, or can be of the zero-center type, with indicia on the adjustment-element for the shield alignable with a marking. Thus the surface density is read directly off the meter or the meter is adjusted to zero and the surface density is read off the knob.

10 Claims, 4 Drawing Figures

APPARATUS FOR MEASURING THE SURFACE DENSITY OF A WEB

FIELD OF THE INVENTION

The present invention relates to an apparatus for measuring the surface density or basis weight of a web. More particularly this invention concerns the nondestructive measuring of mass per unit surface area of a web, such as a textile or paper.

BACKGROUND OF THE INVENTION

A common method of determining basis weight or surface density, that is mass per unit surface area (e.g. $g/m^2$), is simply to take a sample of the web to be tested, determine its surface area, and weigh it. This, of course, requires that the material being sampled be at least partially damaged. Nonetheless this is a common procedure in the textile industry where the supplier furnishes the buyer with a standard sample which the buyer later compares in this manner with a piece cut from the goods delivered. It is also useful to know the surface density of a web in many treatment operations, in order to determine if, for instance, the fabric has absorbed enough size or the like.

Another known method of determining surface density of a web is by means of so-called nondestructive testings. In this method the material to be tested is passed between a source of radiation having a known strength and a detector. This interposition causes the detected level of radiation to drop, and this drop will be in a definable mathematical relationship to the surface density of the interposed sample. Calibration of such devices is often extremely difficult since they are very sensitive to temperature, and they can only be operated by skilled personnel. In addition such devices are usually very expensive and bulky.

OBJECTS OF THE INVENTION

It is therefore an object of the present invention to provide an improved apparatus for determining the surface density of a web or sheet.

Another object of this invention is the provision of an apparatus which is easy to use and allows a moving web to be tested nondestructively.

Yet another object is the provision of such a measuring apparatus which can be used readily even by unskilled personnel.

SUMMARY OF THE INVENTION

These objects are attained according to the present invention in an apparatus for measuring the surface density of a web and having a portable and generally U-shaped closed housing with a pair of hollow arms separated by a slot. A radiation source is provided in one of the arms and a first radiation detector is provided in the other arm across the slot from the source. A second radiation detector is provided in the one arm and a movable shield in the housing is provided with a pair of apertures and lies between the source and the detectors so that its apertures can each be aligned between a respective one of the detectors and the source. This shield is displaceable by an adjusting element outside the housing through means such as a gear linkage, so as to vary the quantity of radiation which falls from the source on each detector. Inside the housing there is provided an electronic circuit which is connected to the two detectors and generates an output corresponding to the relative levels of the radiation from the source detected by these detectors, and an indicator is provided on the outside of the housing which is connected to the circuit means and visually displays the output. Thus this adjustment element is regulated until the meter gives a zero reading, indicating that the same amount of radiation is being detected by each of the radiation detectors. Then the web to be tested is inserted into the slot between the two arms, thereby intercepting some of the radiation moving from the source to the first radiation detector, and causing the output from the electronic circuit means to change to a degree corresponding to the difference between the level of radiation detected by the one detector over that detected by the other. Clearly this difference can be read as the surface density of the interposed web, since the greater the mass interposed between the source and the first detector the more radiation will be intercepted and the greater will be the difference between the outputs of the two detectors.

According to yet another feature of this invention the housing is provided with its own power supply and with a handle so that it can be carried readily from place to place. The user need merely turn it on, calibrate the output to zero, and insert a sample to be tested in the slot. Indeed, he can set this machine downstream of his loom and continuously test the fabric as it comes off the loom, or similarly sample the output of a paper-producing plant.

According to another feature of this invention the adjustment element is provided with indicia alignable with other indicia on the side of the housing. The user, rather than reading surface density off the meter, adjusts the meter to a predetermined position, by manipulation of the adjustment element and then reads the surface density from the adjustment element. It is also within the scope of the invention to calibrate the meter with a percentage range, so that the knob is set for a predetermined surface density, and the variation from this density in one or the other, or even both directions can be read directly off the meter. Thus it is possible for even an unskilled worker to operate this machine with ease. If the unacceptable zone is colored red, for example, even an illiterate operator can use the device to test a web simply by noting when the needle goes into the red zone.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
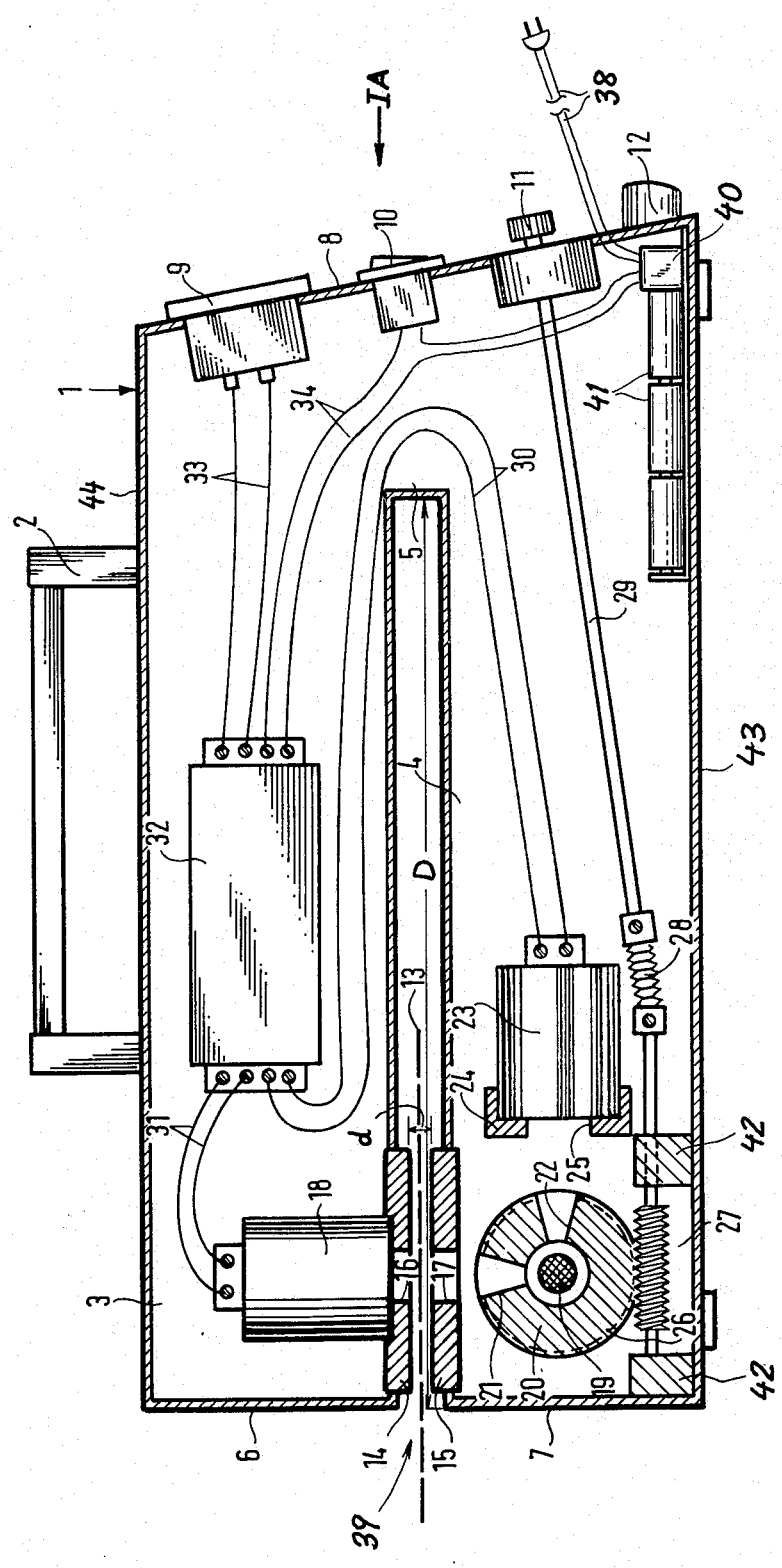
FIG. 1 is a longitudinal section through an apparatus according to the present invention.
Figure 1A:
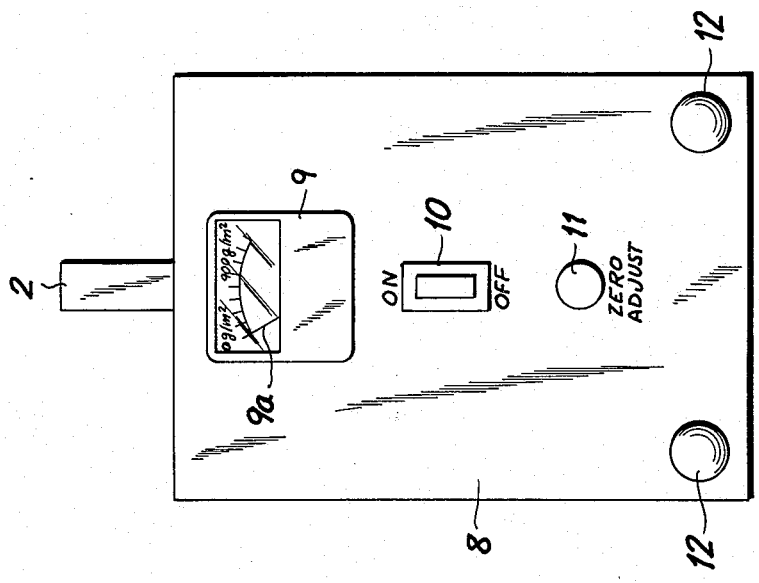
FIG. 1A is a view taken in the direction of arrow IA of FIG. 1.

The arrangement shown in FIGS. 1 and 1A has a housing 1 formed of a pair of arms 3 and 4 defining a slot 40 and separated by a throat 5. The housing is made of metal for maximum radiation shielding. The arm 4 houses a radiation source 19, here a Kr-85 beta source of the gaseous type in a welded stainless capsule. The other arm 3 houses an ionization chamber 18 of the Geiger-Müller type. A shield ring 14 defines a hole 16 on the one arm 14 and another hole 17 is formed in a similar ring 15 on the other arm 4, these two holes 16 and 17 being in line between the source 19 and the detector 18. Similarly another ring 24 defines a hole 25 behind which is arranged another ionization chamber 23. Thus radiation from the source 19 can fall on the detector 18 and the detector 23 simultaneously. A shield in the form of a cylindrical tube has a pair of segmental windows 21 and 22. The source 19 is supported within this shield tube 20 and the windows 21 and 22 are so arranged that one can be directed at the detector 18 while the other is directed at the detector 23. This shield is formed with a circumferential row of teeth 26 engaged by worm 27 journaled in a pair of supports 42 within the arm 4 and driven by a rod 29 through a flexible coupling 28 from an adjustment element 11 on a rear wall 8 of the housing 1. Thus it is possible by adjustment of the zero-adjustment knob 11 to rotate the tube-shield 20 about an axis passing through the source 19 and thereby vary the amount of radiation falling on the two detectors 18 and 23.

The detector 23 is connected via wires 30 and the detector 18 via wires 31 to an electronic circuit 32 housed in the upper arm 3. This circuit 32 is basically a comparator which is connected via wires 34 and an ON-OFF switch 10 to a power supply 40 receiving electricity either from batteries 41 housed in the arm 4 or from an external power source through a line 38 and a plug. The circuit generates an output fed via wires 33 to a meter 9 carried on the rear wall 8. The output in wires 33 corresponds to the difference between the radiation levels detected at the ionization chambers 18 and 23. As shown in FIG. 1A the wall 8 carries a pair of bumpers 12, and this wall 8 is inclined to be vertical when the housing 1 is set on a horizontal surface. The bumpers 12 thus protect the instruments 9, 10, and 11 mounted on this rear wall 8. The front walls 6 and 7 of the arms 3 and 4 of the housing 1 are coplanar and perpendicular to the bottom wall 3 of the housing. The top wall 44 of the housing is provided with a large handle 2 by which the entire unit is adapted to be carried.

The device is operated as follows: First the ON-OFF switch 10 is moved to the ON position. Then the knob 10 is adjusted until the needle 9a of the meter 9 rests at the left hand position corresponding to 0 g/m². A web shown at dashed line 13 is then inserted into the slot 39 and the surface density is read directly on the meter 9. In the embodiment shown a reading from 0 to 900 g/m² can be read directly. An accuracy of ± 2 g/m² is attained below 200 g/m² and between 200 and 900 g/m² and accuracy of ± 1% can be obtained. The distance $d$ between the two shields 14 and 15 is 5 mm and the distance D to the base of the slot 39 is 200 mm. The relatively wide gap having dimension $d$ is extremely advantageous in measuring of the surface density of a moving web, can pass through the device at high speed. The area measured is 3 cm² corresponding to the area of the holes 16 and 17.

The entire unit weighs approximately 9 kg and has dimensions of 320 mm long, 250 mm high, and 120 mm wide. The source 19 used has an activity of 10 mCi, and a half-life of 10.4 years. The radiation emission is at a maximum of less than 0.1 m rem/h at 10 cm from the device. In addition the device only consumes approximately 7 watts of electric power in use, so that it is inexpensive to operate and can readily be battery powered. The use of two detectors makes the apparatus relatively insensitive to variations in voltage.

The legs have an inner length of between 30 and 60 cm and an overall cross-sectional area of between 100 cm² and 300 cm². It is possible to provide the device with an extension yoke in which the sources and detectors are mounted so as to give the slot 39 a depth of 800 mm.

Figure 2A:
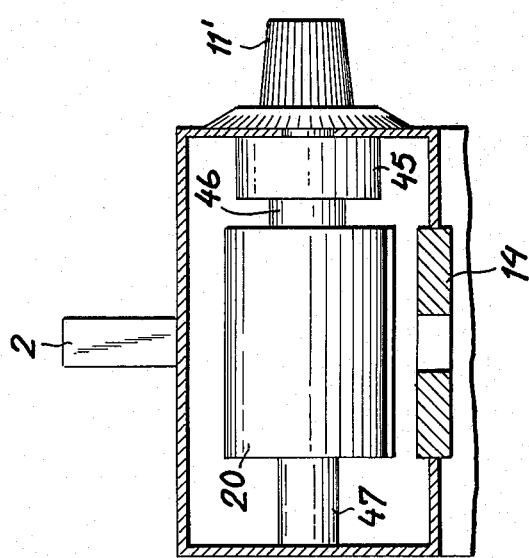
FIG. 2A taken along line IIA—IIA of FIG. 2.
Figure 2:
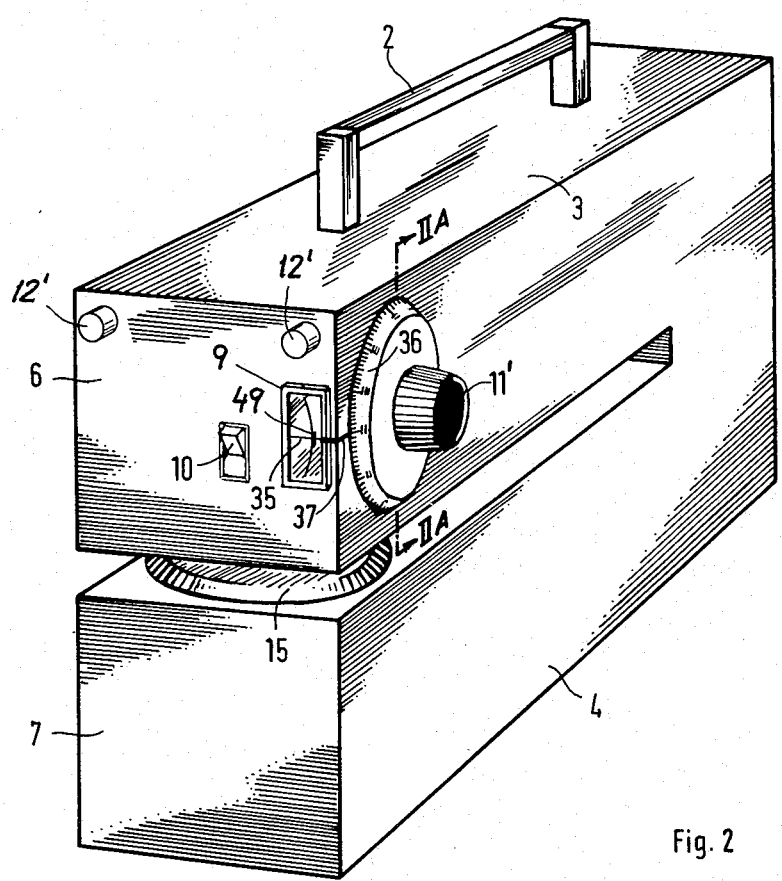
FIG. 2 is a perspective view of a second embodiment of the present invention.

The embodiment shown in FIGS. 2 and 2A is similar to that shown in FIGS. 1 and 1A with like reference numerals being used for like structure. In this embodiment the ON-OFF switch 10 is mounted along with a zero-center meter 9' having a needle 35 alignable with a marking 37 extending around the corner of the housing between the end wall 6 of the arm 3 and side wall thereof. Bumpers 12' on this end wall 6 protect the instruments 9 and 10. Also mounted on this side wall is an adjustment knob 11' connected via planetary gearing 45 as shown in FIG. 2 to a spindle 46 on which is mounted the shield 20. The source 19 is held within the shield 20 on a support rod 47. The meter needle 35 is movable from a central position to either side of the marking 37 in a zone 49 indicating a deviation of 3% as will be described below. In addition the knob 11' is provided with indicia 36 also alignable with the marking 37.

In this arrangement the device is set at the factory so that, when the indicia 36 reading 0 is aligned with the mark 37, the needle 35 will also be in line with this marking 37 so long as the gap between the arms 3 and 4 is clear. When a web is placed between the shields 14 and 15 the needle will move in one direction from the central zone 49 and the knob 11' will have to be adjusted to align needle 35 with the mark 37. The number on the knob 11' which is line with the marking 37 will then correspond to the surface density of the web fitted into the slot 39. Thus the device can be used to ascertain the surface density of a web by placing the web between the two arms 3 and 4 and adjusting the knob 11' until the needle 35 aligns with the marking 37, whereupon the surface density of the web can be read directly from the knob 11'. It is possible for the foreman, for instance, to set knob 11' at a position corresponding to the desired surface density either by aligning the desired reading on knob 11' with the marking 37, or by placing a sample in the slot 39 and setting the meter 9' at the center-zero position. The device can then be given to a relatively unskilled worker who need merely call for help when the needle 35 moves from within the safety zone 49 indicating a deviation of 3% in the surface density. Thus even an illiterate worker can operate the device to measure surface density.

The device according to the present invention allows the surface density of a web, whether it be moving or still, to be rapidly determined with a high degree of accuracy. This device can be used anywhere in a plant producing textiles, paper or the like, and be operated by unskilled personnel with ease. The device is portable so that it eliminates the installation and servicing difficulties of large permanent surface-density measurers. In addition it can be used for quality control throughout the whole plant by a traveling inspector at a considerable saving over the hitherto known devices.

I claim:

1. An apparatus for measuring the surface density of a web, said apparatus comprising:

a portable and generally U-shaped closed housing having a pair of hollow arms separated by a slot open at opposite sides;

a radiation source in one of said arms;

a first radiation detector in the other arm across said slot from said source;

a second radiation detector in said one arm adjacent said source;

a movable shield in said housing between said source and said detectors and having first and second apertures alignable between said source and said first and second detectors respectively;

an adjustment element on a side of said housing;

means in said housing connecting said adjustment element to said shield for displacing same on actuation of said adjustment element to vary the quantity of radiation from said source falling on said detectors;

electronic circuit means in said housing connected to said detectors for generating an output corresponding to the relative levels of radiation from said source detected by said detectors; and indicator means on a side of said housing connected to said circuit means for visually displaying said output.

2. The apparatus defined in claim 1 wherein said housing has one end wall formed with said slot and opposite end wall, said indicator means and said adjustment element being mounted on said opposite wall.

3. The apparatus defined in claim 2 wherein said housing has a flat bottom wall, said one end wall extending generally perpendicularly to said bottom wall and said opposite end wall being inclined upwardly from said bottom wall toward said one end wall.

4. The apparatus defined in claim 3 wherein said opposite end wall is provided with at least one outwardly projecting bumper.

5. The apparatus defined in claim 1 wherein said housing has one end wall formed with said slot and carrying said indicating means.

6. The apparatus defined in claim 1 wherein said shield is a cylindrical tube and said source is received in said tube, said means connecting said element to sadi shield including a support pivotally mounting said tube.

7. The apparatus defined in claim 6 wherein said tube has a pair of segmental windows each constituting one of said apertures.

8. The apparatus defined in claim 1 wherein said detectors are ionization chambers.

9. The apparatus defined in claim 1 wherein said slot has a width adjacent said source between 3 mm and 7 mm.

10. The apparatus defined in claim 1 wherein said arms have a length in said throat between 30 cm and 60 cm and a cross-sectional area between 100 cm$^2$ and 300 cm$^2$.

* * * * *